US012097504B1

(12) United States Patent
Ciotola

(10) Patent No.: US 12,097,504 B1
(45) Date of Patent: Sep. 24, 2024

(54) EXTERNALLY SERRATED ROTARY SHREDDER AND SUBMERSIBLE SHREDDER PUMP HAVING AN EXTERNALLY SERRATED ROTARY SHREDDER

(71) Applicant: Alfredo A. Ciotola, Warren, NJ (US)

(72) Inventor: Alfredo A. Ciotola, Warren, NJ (US)

( * ) Notice: Subject to any disclaimer, the term of this patent is extended or adjusted under 35 U.S.C. 154(b) by 0 days.

(21) Appl. No.: 18/435,664

(22) Filed: Feb. 7, 2024

(51) Int. Cl.
*B02C 18/00* (2006.01)
*B02C 18/24* (2006.01)
*F04C 2/00* (2006.01)
*F04D 7/04* (2006.01)
*F04D 29/22* (2006.01)
*B02C 18/16* (2006.01)

(52) U.S. Cl.
CPC .......... *B02C 18/0092* (2013.01); *B02C 18/24* (2013.01); *F04C 2/00* (2013.01); *F04D 7/045* (2013.01); *F04D 29/2288* (2013.01); *B02C 2018/162* (2013.01)

(58) Field of Classification Search
CPC ........ F04D 7/045; F04D 29/2288; F04C 2/00; B02C 18/0092; B02C 18/18; B02C 18/24
See application file for complete search history.

(56) References Cited

U.S. PATENT DOCUMENTS 3,650,481 A * 3/1972 Conery ............... B02C 18/0092 241/257.1
3,961,758 A * 6/1976 Morgan .............. B02C 18/0092 415/196
4,108,386 A * 8/1978 Conery ............... B02C 18/0092 241/46.11
4,143,993 A * 3/1979 Blum .................. F04D 29/2288 241/46.06
4,361,414 A * 11/1982 Nemes .................. F04D 29/447 415/121.1
4,378,093 A * 3/1983 Keener ............... B02C 18/0092 241/46.06
4,454,993 A * 6/1984 Shibata ................... F04D 7/045 241/46.11
4,640,666 A * 2/1987 Sodergard ............... F04D 7/045 241/46.11
4,697,746 A * 10/1987 Nishimori ........... B02C 18/0092 241/46.11

(Continued)

*Primary Examiner* — Faye Francis
(74) *Attorney, Agent, or Firm* — Roberts & Roberts, LLP

(57) ABSTRACT

An externally serrated rotary shredder and submersible shredder pump having an externally serrated rotary shredder. These are for reducing the size of solids within a liquid which is to be pumped by shredding. An improvement over prior designs employs a cutting assembly and a shredder pump. The cutting assembly has a centrally positioned stationary dual sided plate cutter which engages first and second rotary cutters on alternate sides of a centrally positioned dual sided plate cutter. The first rotary cutter has cutting lobes having upper and lower cutting surfaces. The waste water contents have a finer grind which improves removal and reduces the likelihood of shredder pump clogging. The cutter assembly is configured for mounting to an intake opening of a stationary volute associated with a shredder pump. Many more cutting surfaces are provided which more quickly shred the solid materials within the liquid to be expelled.

20 Claims, 18 Drawing Sheets

(56) References Cited

U.S. PATENT DOCUMENTS

| | | | | | |
|---|---|---|---|---|---|
| 4,842,479 | A * | 6/1989 | Dorsch | F04D 7/045 | 415/206 |
| 5,016,825 | A * | 5/1991 | Carpenter | F04D 29/2288 | 241/46.06 |
| 5,044,566 | A * | 9/1991 | Mitsch | F04D 7/045 | 241/46.06 |
| 5,256,032 | A * | 10/1993 | Dorsch | F04D 7/045 | 415/121.1 |
| 6,010,086 | A * | 1/2000 | Earle, III | F04D 7/045 | 241/46.11 |
| 6,190,121 | B1 * | 2/2001 | Hayward | F04D 7/045 | 415/206 |
| 6,367,723 | B1 * | 4/2002 | Kircher | B02C 23/04 | 241/73 |
| 7,159,806 | B1 * | 1/2007 | Ritsema | F04D 3/02 | 241/89.4 |
| 7,237,736 | B1 * | 7/2007 | Martin | F04D 7/045 | 241/46.06 |
| 8,784,038 | B2 | 7/2014 | Ciotola | | |
| 10,487,835 | B1 | 11/2019 | Ciotola | | |
| 11,396,023 | B1 | 7/2022 | Ciotola | | |

* cited by examiner

EXTERNALLY SERRATED ROTARY SHREDDER AND SUBMERSIBLE SHREDDER PUMP HAVING AN EXTERNALLY SERRATED ROTARY SHREDDER

BACKGROUND OF THE INVENTION

Field of the Invention

The present invention relates to an externally serrated rotary shredder and high volume submersible shredder pump having an externally serrated rotary shredder. These are for reducing the size of solids within a liquid which is to be pumped by chopping, shredding, cutting or grinding.

Description of the Related Art

There is great commercial interest in centrifugal pumps which are capable of pumping liquids and slurries containing solid matter such as small pieces of disposed items. These pumps have the capability of chopping, shredding, cutting or grinding solid matter in the liquid mixture permitting the output from the pump to be disposed of more readily. Shredding pumps are used in liquid transfer applications that require size reduction for solid or semisolid materials contained in a liquid, in order to cut or shred such materials.

The pump of the present invention includes an improved externally serrated rotary shredder which is particularly useful when mounted to the suction side of submersible pumps that pump raw sewage, fish silage, byproducts of slaughter houses, waste water of paper mills and similar tough applications. These solid or semisolid materials are reduced in size such that a slurry is formed, which is more easily pumped than the solids themselves. The externally serrated edges of the rotary cutter will also prevent the suction of the pump from being smothered by a large fibrous item. Known grinder pumps have an inlet connected to a pumping chamber, or volute, and a driven shaft extending through the pumping chamber, or volute, and into the inlet. The shaft rotates a cutting cylinder or disk in proximity to a plate cutter, thereby effecting the cutting action of the pump. Many other variations and configurations of grinder pumps are known, which provide shearing action between parts operating cooperatively at close tolerances. Examples of such pumps are disclosed in prior U.S. Pat. Nos. 3,650,081; 3,961,758; 4,108,386; 4,378,093; 4,454,993; 4,640,666; 4,697,746; 4,842,479; 5,016,825; 5,044,566; 5,256,032; 6,010,086; and 6,190,121. U.S. Pat. No. 7,159,806 provides a cutting assembly for a grinder pump comprised of a rotary cutter rotatable against an opposing plate cutter. The cutting edges of the plate cutter include a plurality of V-slice cutting teeth, which create bridging spaces to pinch material which is being sucked in to ports and begin cutting along the V-slice and then for cut material to pass through and onward into the volute of the pump.

U.S. Pat. No. 8,784,038, which is incorporated herein by reference, describes a single cutter assembly and an associated high volume submersible shredder pump. It provides a cutter assembly employing cutting lobes having a grooved surface which mate with corresponding grooves of a circular plate cutter. A problem with the mechanism of U.S. Pat. No. 8,784,038 is that it has a flat stationary disc and a flat rotary cutter such that some of the waste contents which are ground up are too large and have a tendency to clog the associated shredder pump.

U.S. Pat. No. 10,487,835, which is incorporated herein by reference, shows an improved single cutter assembly and associated submersible shredder pump whose cutter assembly has a cup-shaped, concave, plate cutter. It improves upon the cutter assembly of U.S. Pat. No. 8,784,038 by providing a more aggressive cutter arrangement including a cup-shaped, concave, plate cutter which mates with a corresponding rotary cutter having a plurality of cutting lobes. The inside walls of the cup-shaped, concave, plate cutter has a plurality of spaced apart concentric grooves and a concentric dividing wall between adjacent grooves. The underside of each of the cutting lobes has corresponding concentric grooves and concentric dividing walls which juxtapose and mate with those of the cup-shaped, concave, plate cutter. U.S. Pat. No. 11,396,023, which is incorporated herein by reference, provides an improved cutting assembly and shredder pump having a dual sided plate cutter which engages first and second rotary cutters on alternate sides of a centrally positioned dual sided plate cutter. In operation the waste water contents have a much finer grind which improves efficient removal and reduces the likelihood of shredder pump clogging. The present invention provides a further improved externally serrated rotary shredder and submersible shredder pump which even further reduces the likelihood of shredder pump clogging. It was found that if a large object such as bed sheet, large towel or pillow was introduced into a prior art shredder pump, the pump would be "Smothered" and the object did not get to the cutters. When a rotary cutter is used a counter flow prevents the smothering action. An outward flow from the rotary cutter using 3 lobes which end in a serrated knife edge made a huge performance improvement. Thus the present invention comprises rotary cutter that creates an outward axial flow regardless of the sense of rotation, and prevents large objects from potentially smothering the pump. This rotary cutter will also chip way and shred any object large or small that comes in contact with it.

SUMMARY OF THE INVENTION

The invention provides a cutting assembly comprising:

a) a drive shaft alternately rotatable in a first direction of rotation and a second direction of rotation;

b) a centrally positioned plate cutter having a circular horizontal cross-section, the plate cutter adapted for mounting to an intake opening of a stationary volute; said plate cutter having a first cutting side and an opposing second cutting side; each of the first cutting side and second cutting side of said plate cutter having one or more side walls terminating at a floor, and a plate cutter bore through the floor; each of the side walls having a plurality of spaced apart concentric grooves and a concentric dividing wall between adjacent grooves; each of the grooves and each of the dividing walls having the shape of an arc of a circle which is concentric with a central axis of the bore of the plate cutter; the drive shaft being mounted for rotation within the bore of the plate cutter; the plate cutter having a plurality of holes through the one or more side walls;

c) a first rotary cutter comprising a circular hub having a bore through a central axis of the hub, the first rotary cutter fixed to said drive shaft with an implement for fixing the drive shaft through the circular hub of the first rotary cutter within the bore; a plurality of cutting lobes fixed around the circular hub, each of said cutting lobes having an upper surface, a lower surface opposite to the upper surface, a leading edge and a trailing edge opposite to the leading edge; each cutting lobe having an aperture there through extending from and through the upper surface to and through the lower surface; each of the cutting lobes extending outwardly from the hub such that a center line equidistant between the leading edge and the trailing edge of each cutting lobe is substantially perpendicular to the central axis of the hub; the cutting lobes being distributed around a periphery of the hub such that each of the distances from the leading edge of each cutting lobe to the trailing edge of a next adjacent cutting lobe are substantially equal;

i) the lower surface of each cutting lobe having a plurality of spaced apart grooves and a dividing wall between adjacent grooves, the grooves and dividing walls of each cutting lobe extending either from its leading edge to its trailing edge or from its leading edge to its aperture and from its aperture to its trailing edge; each of said grooves and dividing walls having the shape of an arc of a circle which is concentric with the central axis of the hub; the grooves and dividing walls from the lower surface of each cutting lobe being juxtaposed with corresponding dividing walls and grooves from the first cutting side of the plate cutter;

ii) the upper surface of each cutting lobe having a plurality of spaced apart grooves and a dividing wall between adjacent grooves, the grooves and dividing walls of each cutting lobe extending either from its leading edge to its trailing edge or from its leading edge to its aperture and from its aperture to its trailing edge; each of said grooves and dividing walls having the shape of an arc of a circle which is concentric with the central axis of the hub;

d) a second rotary cutter comprising a second circular hub having a second bore through a central axis of the second circular hub, the second rotary cutter fixed to said drive shaft with an implement for fixing the drive shaft through the second circular hub of the second rotary cutter within the second bore; a plurality of cutting edges fixed around the circular hub, each of said cutting edges having an upper surface; each of the cutting edges extending outwardly from the hub substantially perpendicular to the central axis of the hub; the cutting edges being distributed around a periphery of the second circular hub; each cutting edge comprising a plurality of spaced apart grooves and a dividing wall between adjacent grooves; each of said grooves and dividing walls having the shape of an arc of a circle which is concentric with the central axis of the second circular hub; the grooves and dividing walls from the upper surface of each cutting edge being juxtaposed with corresponding dividing walls and grooves from the second cutting side of the plate cutter.

The invention also provides a shredder pump comprising:

i) a stationary volute having an intake opening, and a discharge opening;

ii) a cutting assembly mounted in front of the intake opening, the cutting assembly comprising:

a) a drive shaft alternately rotatable in a first direction of rotation and a second direction of rotation;

b) a centrally positioned plate cutter having a circular horizontal cross-section, the plate cutter adapted for mounting to an intake opening of a stationary volute; said plate cutter having a first cutting side and an opposing second cutting side; each of the first cutting side and second cutting side of said plate cutter having one or more side walls terminating at a floor, and a plate cutter bore through the floor; each of the side walls having a plurality of spaced apart concentric grooves and a concentric dividing wall between adjacent grooves; each of the grooves and each of the dividing walls having the shape of an arc of a circle which is concentric with a central axis of the bore of the plate cutter; the drive shaft being mounted for rotation within the bore of the plate cutter; the plate cutter having a plurality of holes through the one or more side walls;

c) a first rotary cutter comprising a circular hub having a bore through a central axis of the hub, the first rotary cutter fixed to said drive shaft with an implement for fixing the drive shaft through the circular hub of the first rotary cutter within the bore; a plurality of cutting lobes fixed around the circular hub, each of said cutting lobes having an upper surface, a lower surface opposite to the upper surface, a leading edge and a trailing edge opposite to the leading edge; each cutting lobe having an aperture there through extending from and through the upper surface to and through the lower surface; each of the cutting lobes extending outwardly from the hub such that a center line equidistant between the leading edge and the trailing edge of each cutting lobe is substantially perpendicular to the central axis of the hub; the cutting lobes being distributed around a periphery of the hub such that each of the distances from the leading edge of each cutting lobe to the trailing edge of a next adjacent cutting lobe are substantially equal;

i) the lower surface of each cutting lobe having a plurality of spaced apart grooves and a dividing wall between adjacent grooves, the grooves and dividing walls of each cutting lobe extending either from its leading edge to its trailing edge or from its leading edge to its aperture and from its aperture to its trailing edge; each of said grooves and dividing walls having the shape of an arc of a circle which is concentric with the central axis of the hub; the grooves and dividing walls from the lower surface of each cutting lobe being juxtaposed with corresponding dividing walls and grooves from the first cutting side of the plate cutter;

ii) the upper surface of each cutting lobe having a plurality of spaced apart grooves and a dividing wall between adjacent grooves, the grooves and dividing walls of each cutting lobe extending either from its leading edge to its trailing edge or from its leading edge to its aperture and from its aperture to its trailing edge; each of said grooves and dividing walls having the shape of an arc of a circle which is concentric with the central axis of the hub;

d) a second rotary cutter comprising a second circular hub having a second bore through a central axis of the second circular hub, the second rotary cutter fixed to said drive shaft with an implement for fixing the drive shaft through the second circular hub of the second rotary cutter within the second bore; a plurality of cutting edges fixed around the circular hub, each of said cutting edges having an upper surface; each of the cutting edges extending outwardly from the hub substantially perpendicular to the central axis of the hub; the cutting edges being distributed around a periphery of the second circular hub; each cutting edge comprising a plurality of spaced apart grooves and a dividing wall between adjacent grooves; each of said grooves and dividing walls having the shape of an arc of a circle which is concentric with the central axis of the second circular hub; the grooves and dividing walls from the upper surface of each cutting edge being juxtaposed with corresponding dividing walls and grooves from the second cutting side of the plate cutter;

wherein the drive shaft is mounted for rotation through a wall of the stationary volute by a bearing and sealed by a mechanical seal; iii) an impeller in the stationary volute fixed around the drive shaft; iv) an electric motor attached to an outer portion of the stationary volute, and fixed to the drive shaft for rotating the drive shaft within the stationary volute.

The invention further provides a method of shredding a solid within a liquid comprising:

I) providing a shredder pump comprising:

i) a stationary volute having an intake opening, and a discharge opening; ii) a cutting assembly mounted in front of the intake opening, the cutting assembly comprising:

a) a drive shaft alternately rotatable in a first direction of rotation and a second direction of rotation;

b) a centrally positioned plate cutter having a circular horizontal cross-section, the plate cutter adapted for mounting to an intake opening of a stationary volute; said plate cutter having a first cutting side and an opposing second cutting side; each of the first cutting side and second cutting side of said plate cutter having one or more side walls terminating at a floor, and a plate cutter bore through the floor; each of the side walls having a plurality of spaced apart concentric grooves and a concentric dividing wall between adjacent grooves; each of the grooves and each of the dividing walls having the shape of an arc of a circle which is concentric with a central axis of the bore of the plate cutter; the drive shaft being mounted for rotation within the bore of the plate cutter; the plate cutter having a plurality of holes through the one or more side walls;

c) a first rotary cutter comprising a circular hub having a bore through a central axis of the hub, the first rotary cutter fixed to said drive shaft with an implement for fixing the drive shaft through the circular hub of the first rotary cutter within the bore; a plurality of cutting lobes fixed around the circular hub, each of said cutting lobes having an upper surface, a lower surface opposite to the upper surface, a leading edge and a trailing edge opposite to the leading edge; each cutting lobe having an aperture there through extending from and through the upper surface to and through the lower surface; each of the cutting lobes extending outwardly from the hub such that a center line equidistant between the leading edge and the trailing edge of each cutting lobe is substantially perpendicular to the central axis of the hub; the cutting lobes being distributed around a periphery of the hub such that each of the distances from the leading edge of each cutting lobe to the trailing edge of a next adjacent cutting lobe are substantially equal;

i) the lower surface of each cutting lobe having a plurality of spaced apart grooves and a dividing wall between adjacent grooves, the grooves and dividing walls of each cutting lobe extending either from its leading edge to its trailing edge or from its leading edge to its aperture and from its aperture to its trailing edge; each of said grooves and dividing walls having the shape of an arc of a circle which is concentric with the central axis of the hub; the grooves and dividing walls from the lower surface of each cutting lobe being juxtaposed with corresponding dividing walls and grooves from the first cutting side of the plate cutter;

ii) the upper surface of each cutting lobe having a plurality of spaced apart grooves and a dividing wall between adjacent grooves, the grooves and dividing walls of each cutting lobe extending either from its leading edge to its trailing edge or from its leading edge to its aperture and from its aperture to its trailing edge; each of said grooves and dividing walls having the shape of an arc of a circle which is concentric with the central axis of the hub;

d) a second rotary cutter comprising a second circular hub having a second bore through a central axis of the second circular hub, the second rotary cutter fixed to said drive shaft with an implement for fixing the drive shaft through the second circular hub of the second rotary cutter within the second bore; a plurality of cutting edges fixed around the circular hub, each of said cutting edges having an upper surface; each of the cutting edges extending outwardly from the hub substantially perpendicular to the central axis of the hub; the cutting edges being distributed around a periphery of the second circular hub; each cutting edge comprising a plurality of spaced apart grooves and a dividing wall between adjacent grooves; each of said grooves and dividing walls having the shape of an arc of a circle which is concentric with the central axis of the second circular hub; the grooves and dividing walls from the upper surface of each cutting edge being juxtaposed with corresponding dividing walls and grooves from the second cutting side of the plate cutter;

wherein the drive shaft is mounted for rotation through a wall of the stationary volute by a bearing and sealed by a mechanical seal; iii) an impeller in the stationary volute fixed around the drive shaft; iv) an electric motor attached to an outer portion of the stationary volute, and fixed to the drive shaft for rotating the drive shaft within the stationary volute;

II) causing the electric motor to rotate the drive shaft in at least one direction of rotation;

III) passing the liquid, and the solid, through the cutting assembly and into the stationary volute, and then causing the impeller to propel the liquid and the solid through the discharge opening.

DESCRIPTION OF THE INVENTION

Figure 1:
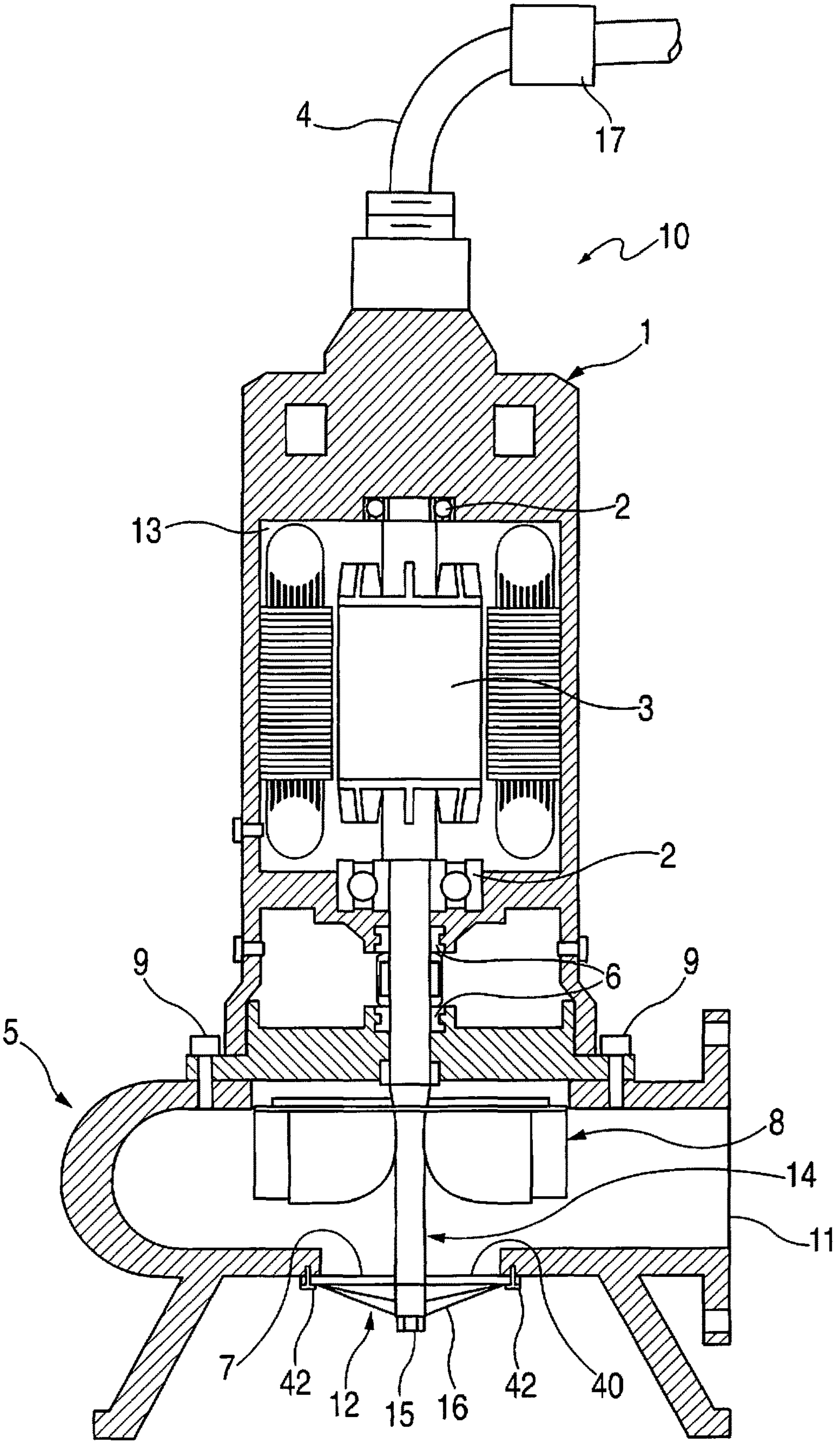
FIG. 1 is a cross sectional view illustrating a shredder pump according to the invention.

FIG. 1 illustrates a shredder pump 10 according to the invention. It is shown to comprise a housing 1, encompassing a central motor chamber 13, in which is mounted an electric motor 3 which is powered by power cord 4. Motor 3 is preferably a heavy duty, oil filled, and thermally protected motor, as is well known in the art. Motor 3 is securely mounted to the housing 1 via upper and lower ball bearings 2. The motor rotates drive shaft 14 which in turn drives a non-wadding bidirectional impeller 8 within a stationary volute 5. Such impeller being of a conventional unidirectional type or a vortex type, capable of pumping equally in either direction of rotation. The bidirectional feature can double the life of the shredding mechanism. Preferably the electric motor 3 is a bidirectional electric motor capable of rotating shaft 14 alternately in a first direction of rotation and a second direction of rotation responsive to controller 17. The volute is attached to housing 1, such as by bolts 9. Volute 5 has an intake opening 7, and a discharge opening 11. Shaft 14 extends from motor 3 through a lower floor of housing 1, through an upper wall of volute 5, and through intake opening 7. Motor 3 is separated from the volute 5 by mechanical seals 6 positioned around the shaft 14. The mechanical seals 6 prevent the entry of liquid into the motor chamber. Thus the drive shaft 14 is mounted for rotation through an upper wall of the volute by the lower of bearings 2 and sealed by mechanical seal 6. Rotatably fixed to an end of drive shaft 14 is a cutting assembly 12. The cutting assembly 12 comprises the end of drive shaft 14 which is attached to a first rotary cutter 16, a second rotary cutter, and a centrally positioned stationary circular plate cutter 40 having a first cutting side and an opposing second cutting side variations of which will be described below.

The first rotary cutter 16 is fixed to the drive shaft, and has a plurality of cutting lobes 24 juxtaposed with corresponding parts of the first cutting side of the plate cutter 40. A second rotary cutter 19 is fixed to the drive shaft, and is juxtaposed with corresponding parts of the second side of the plate cutter 40.

In one embodiment of the cutting assembly, the plate cutter 40 is generally planar in shape. In another embodiment of the cutting assembly, the plate cutter 40 is cup shaped and generally semi-spherical in shape. In another embodiment of the cutting assembly the plate cutter 40 is cup shaped and generally conical in shape. In yet another embodiment of the cutting assembly, the plate cutter 40 is cup shaped and generally cylindrical in shape.

Figure 2:
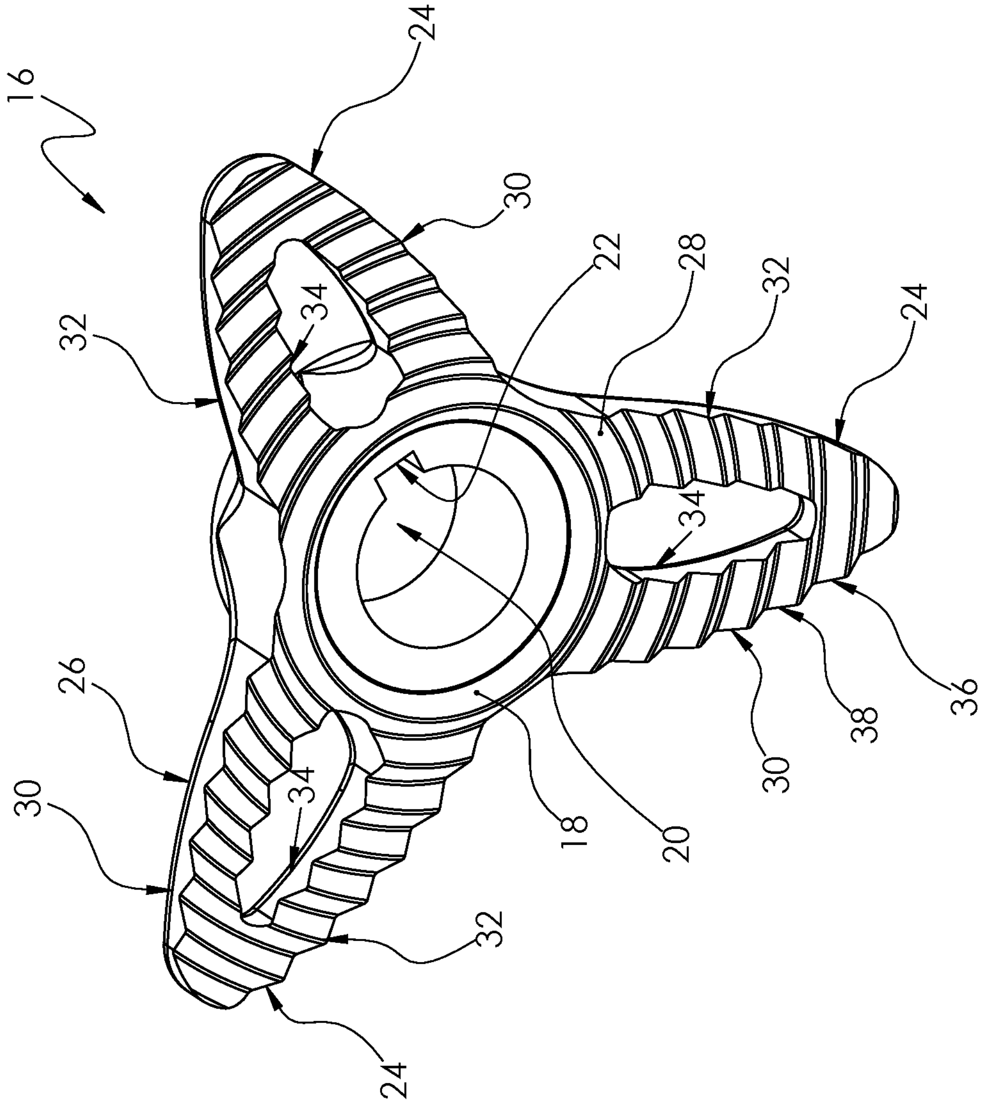
FIG. 2 shows a perspective view of a lower surface of a rotary cutter.
Figure 3:
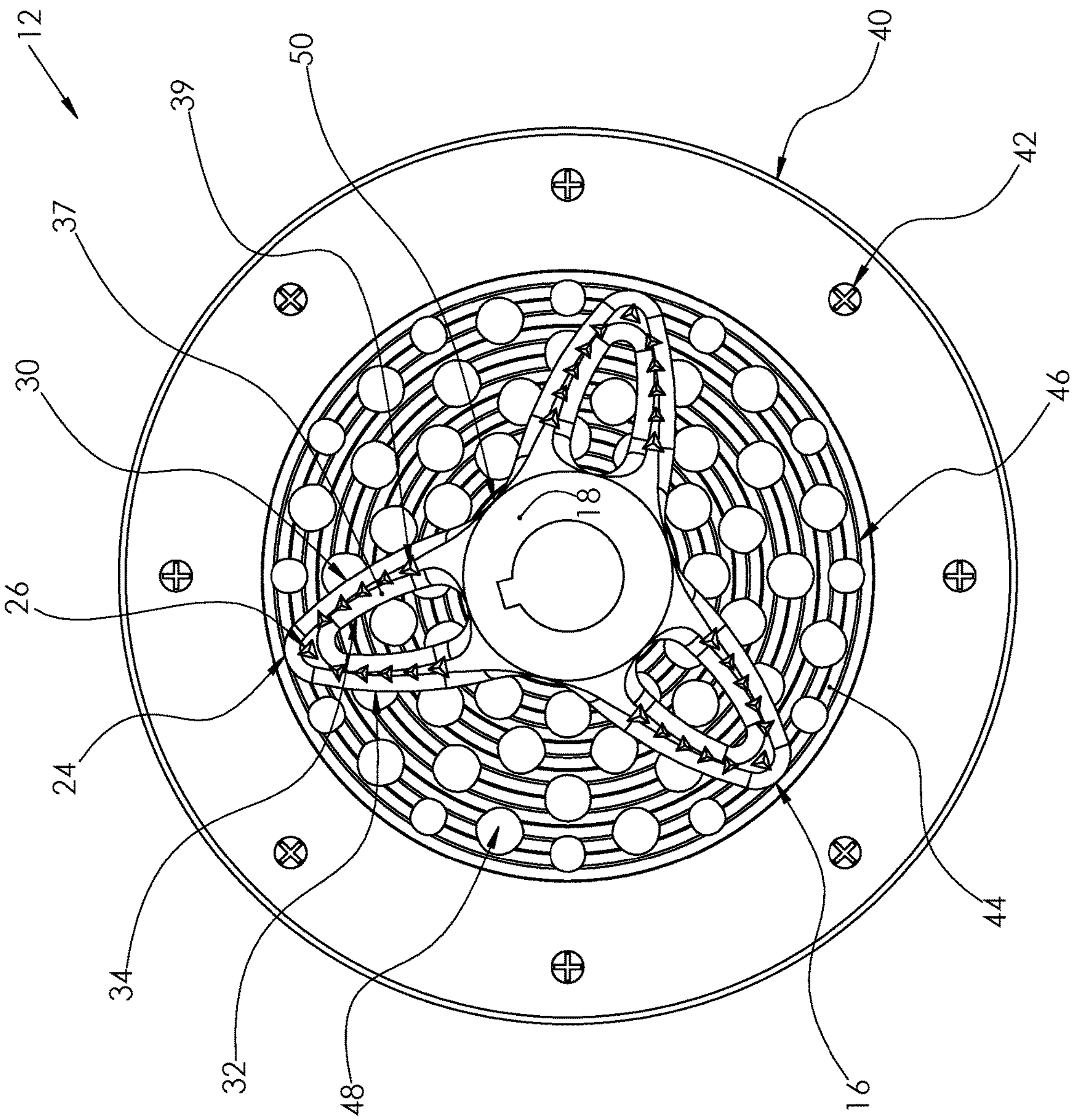
FIG. 3 shows an assembly of circular plate cutter and a rotary cutter juxtaposed with one another.

FIG. 2 shows a detached, perspective view featuring a lower surface of a first rotary cutter 16 which is fixed to and rotatable driven by drive shaft 14 as seen in FIG. 3. First rotary cutter 16 comprises a circular hub 18 having a bore 20 through a central axis of the bore. It has a suitable implement for fixing the drive shaft within the bore such as keyway 22, key 122, and end cap 50, which is shown in FIG. 3. Extending outwardly from hub 18 are a plurality of cutting lobes 24. Each of the cutting lobes 24 have an upper surface 26, a lower surface 28 opposite to the upper surface, a leading edge 30 and a trailing edge 32 opposite to the leading edge. Each cutting lobe has an aperture 34 there through extending from and through the upper surface 26 to and through the lower surface 28. Each of the cutting lobes 24 extend outwardly from the hub 18 such that a center line equidistant between the leading edge 30 and the trailing edge 32 of each cutting lobe 24 is substantially perpendicular to the central axis of the hub 18. The cutting lobes 24 are distributed around a periphery of the hub 18 such that each of the distances from the leading edge 30 of each cutting lobe to the trailing edge 32 of a next adjacent cutting lobe are substantially equal. It is most preferred that the lobes 24 be substantially equally spaced around the hub 18 so that the rotary cutter 16 is balanced when rotating.

As best seen in FIG. 3, the upper surface 26 of each cutting lobe 24 preferably has a convex curvature extending from its leading edge 30 to its aperture 34 and from its aperture 34 to its trailing edge 32. The upper surface 26 of each cutting lobe 24 has a plurality of grooves 37 and a dividing wall 39 between adjacent grooves 37, thus forming serrations. The grooves 37 and dividing walls 39 of each cutting lobe 24 extend either from its leading edge 30 to its trailing edge 32 or from its leading edge 30 to its aperture 34 and from its aperture 34 to its trailing edge 32. Each of said grooves 37 has the shape of an arc of a circle which is concentric with the central axis of the hub 18. As seen in FIG. 2, the lower surface 28 of each cutting lobe 24 has a plurality of grooves 36 and a dividing wall 38 between adjacent grooves 36. The grooves 36 and dividing walls 38 of each cutting lobe 24 extend either from its leading edge 30 to its trailing edge 32 or from its leading edge 30 to its aperture 34 and from its aperture 34 to its trailing edge 32. Each of said grooves 36 has the shape of an arc of a circle which is concentric with the central axis of the hub 18. As seen in FIG. 3, a further part of the cutting assembly is a circular plate cutter 40, having cutting edges in both of its sides. Circular plate cutter 40 is mounted in front of the intake opening 7 of volute 5, such as by screws 42.

The circular plate cutter 40 has a central plate bore for receiving shaft 14, and a surface having a plurality of concentric grooves 44 and a dividing wall 46 between adjacent grooves 44. Each of the grooves 44 has the shape of an arc of a circle which is concentric with a central axis of the bore, as well as the hub a rotary cutter 16. The drive shaft 14 is mounted for rotation within the circular plate cutter bore. In this embodiment, the plate cutter 40 has a plurality of holes 48 extending completely there through from its top surface to its bottom surface. Although shown as circular holes in FIG. 3, the holes can be any of a variety of perforations of any shape, such as any geometrical shape, for example, circular, triangular, rectangular, polygonal, star-shaped, and the like, or they may be curved slots, slanted slots, radially arranged slots of any convenient length and width, or combinations thereof. In one embodiment, the holes 48, regardless of their shape, may be tapered in the thickness between the top surface and the bottom surface of plate cutter 40, thus providing each hole with an enhanced knife-like edge. When the cutting lobes 24 are mounted on shaft 14, the grooves 36 and dividing walls 38 from the lower surface of each cutting lobe 24 are juxtaposed with corresponding dividing walls 46 and grooves 44 from the circular plate cutter 40. Preferably the cutting lobes 24 are separated from the circular plate cutter 40 by a few thousandths of an inch by a metal spacer.

FIG. 3 shows an assembly 12 of circular plate cutter 40, lobes 24 of rotary cutter 16 which are juxtaposed with one another. The shaft 14, and rotary cutter 16 are preferably held together by a keyed joint, for example a key along shaft 14 which enters a keyway through the respective central bore of circular plate cutter 40, and rotary cutter 16, and finally attached by an end cap 50 and a socket head screw 15. The socket head screw 15 holds end cap 50 against rotary cutter 16, and preferably threads right into shaft 14. Although FIG. 2 and FIG. 3 show rotary cutters having three lobes, any desired number of lobes may be employed, for example from 2 lobes to 6 lobes, preferably 2 to 4 lobes.

Figure 4A:
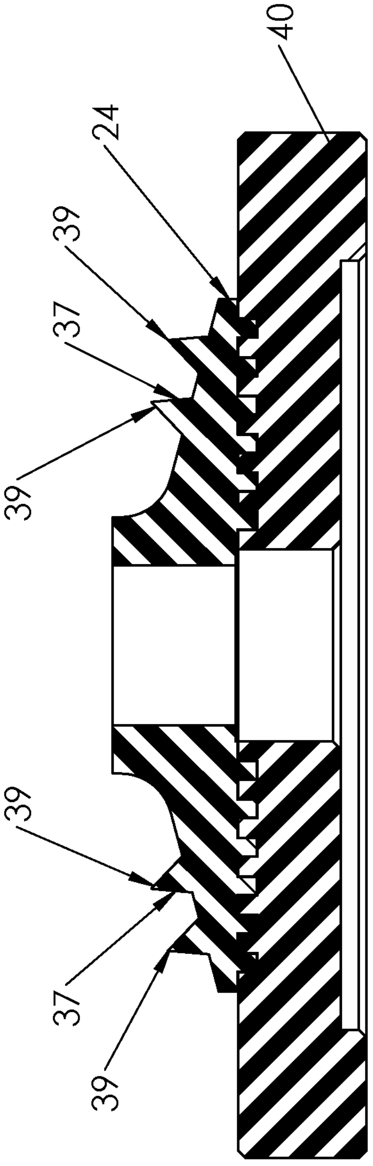
FIGS. 4(*a*), (*b*) and (*c*) show cross sections of the mating grooves and dividing walls of variants of a rotary cutter and a circular plate cutter.
Figure 4B:
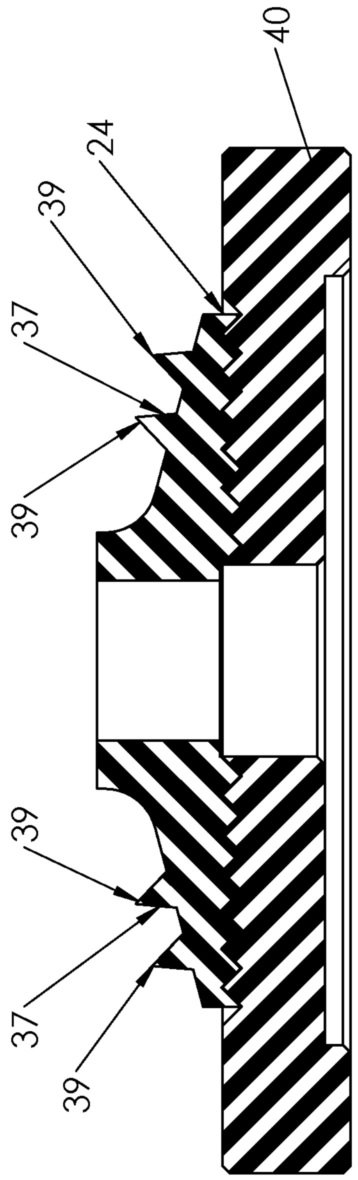
Figure 4C:
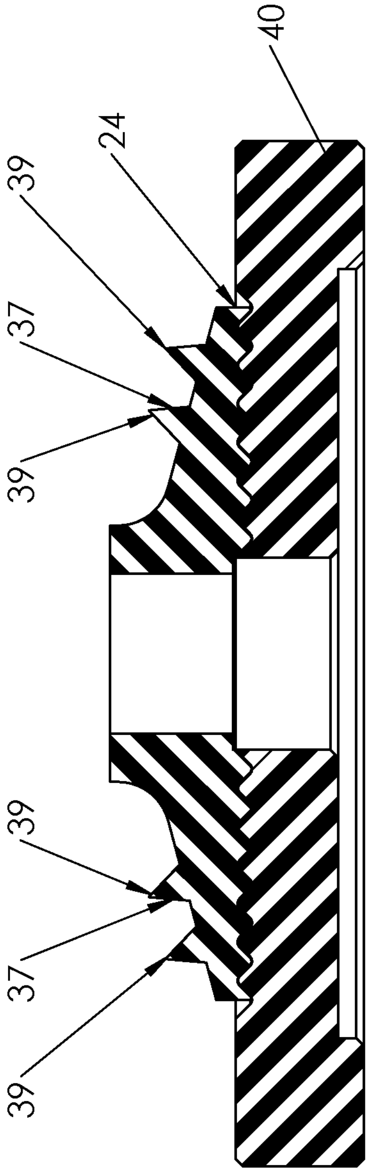

The grooves 36 and dividing walls 38 from the lower surface of each cutting lobe 24 and corresponding dividing walls 46 and grooves 44 from the circular plate cutter 40, may have any convenient shape. In one embodiment, each of the grooves and dividing wall between adjacent grooves form a generally rectangular shaped cross-section as seen in FIG. 4(*a*). In another embodiment, each of the grooves and dividing wall between adjacent grooves form a generally V-shaped or triangular cross-section as seen in FIG. 4(*b*). In yet another embodiment, each of the grooves and dividing wall between adjacent grooves form a generally semi-circular shaped cross-section as seen in FIG. 4(*c*).

The mating grooves and dividing walls of the cutting lobes 24 and the circular plate cutter 40 present an improvement over the prior art by providing a much greater shredding surface area for size reduction of solids within liquids. In addition, the lobes having leading and trailing edges and central apertures in combination with the plurality of holes through the surface of the plate cutter, provide a much greater number of cutting edges for the reduction of solids. The upper surface 26 of each cutting lobe 24 has a plurality of spaced apart grooves 37, and a dividing wall 39 between adjacent grooves. The grooves 37 and dividing walls 39 together form a series of serrations on the upper part of each cutting lobe 24 and extend either from its leading edge to its trailing edge or from its leading edge to its aperture and from its aperture to its trailing edge. Each of the grooves and dividing walls has the shape of an arc of a circle which is concentric with the central axis of the hub. This upper surface thus provides an improved externally serrated rotary shredder which further reduces the likelihood of shredder pump clogging when attached to a shredder pump. When such a rotary cutter is used a counter flow prevents the smothering action of debris to be shredded. An outward flow from the rotary cutter using 3 lobes which end in a serrated knife edge made a huge performance improvement. Thus the rotary cutter creates an outward axial flow regardless of the sense of rotation, and prevents large objects from potentially smothering the pump. This rotary cutter will also chip way and shred any object large or small that comes in contact with it.

In order to calculate at the net "Flow Area", which is the equivalent area of a non-obstructed volute inlet opening, one deducts the area that is constantly being obstructed by the rotating cutter. Therefore, Net "Flow Area"=Total Area of the holes in the stationary circular plate cutter-Total Area being obstructed by the rotating rotary cutter. In the embodiment described herein having an aperture in each of the lobes of the rotating cutter lobes two distinct advantages are obtained, namely a reduction in the area being obstructed by the rotating cutter, which in turn increases the Net "Flow Area", and an increase in the number of contact edges. Thus one prior art shredder pump claims 108 cuts per revolution. A non-exclusive example of the use of the inventive shredder pump may well shred solids at a rate of from about 1000 to about 3000 cuts per revolution.

Figure 5:
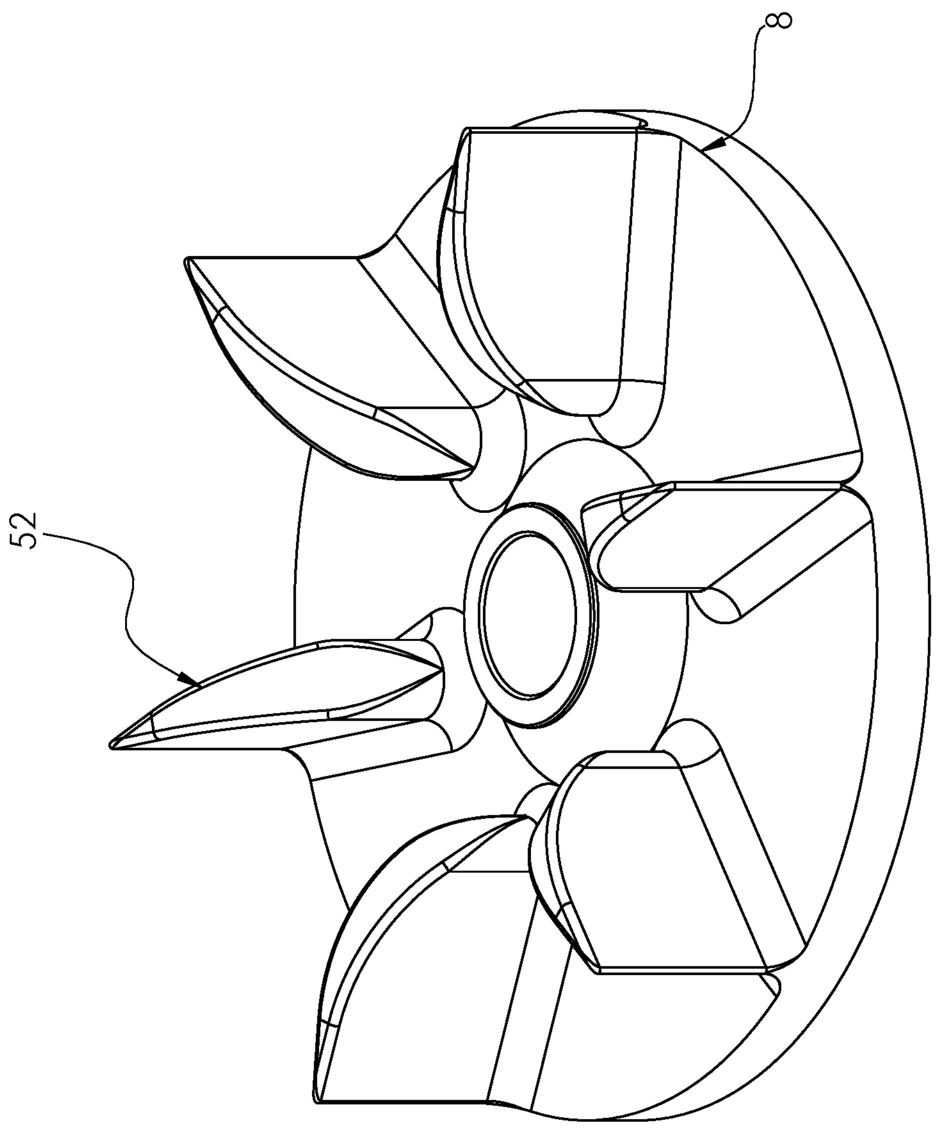
FIG. 5 shows a bidirectional impeller which is useful for the present invention.

FIG. 5 shows a bidirectional impeller 8 which is useful for the present invention. Impeller 8 is mounted for rotation around shaft 14 within volute 5, as seen in FIG. 1. It is shown to comprise a plurality of vanes 52. The number of vanes is easily determinable by the skilled artisan for the desired application. FIG. 5 shows 6 vanes. Each vane 52 has opposing curved faces having a convex surface. Such a bidirectional impeller is capable of propelling fluids and imbedded solids within the liquid toward the discharge opening 11 of volute 5 when the shaft is rotating in either of the first direction of rotation or a second direction of rotation. In one embodiment the shredder pump of the invention further comprises a controller 17 for alternating the direction of rotation of the shaft 14 in a first direction of rotation and a second direction of rotation. This is particularly useful when the controller senses an overload caused by excessive solids jammed in the openings of plate cutter 40, and automatically reverses the rotation of rotary cutter 16. This enables some of the solids to become dislodged, and the remaining solids to be cut by the new leading edges of the cutting lobes. The reversing feature is also very useful to undo any stringy material wadded around the rotary cutter 16. Such reverse direction controllers are well known in the art.

Figure 6A:
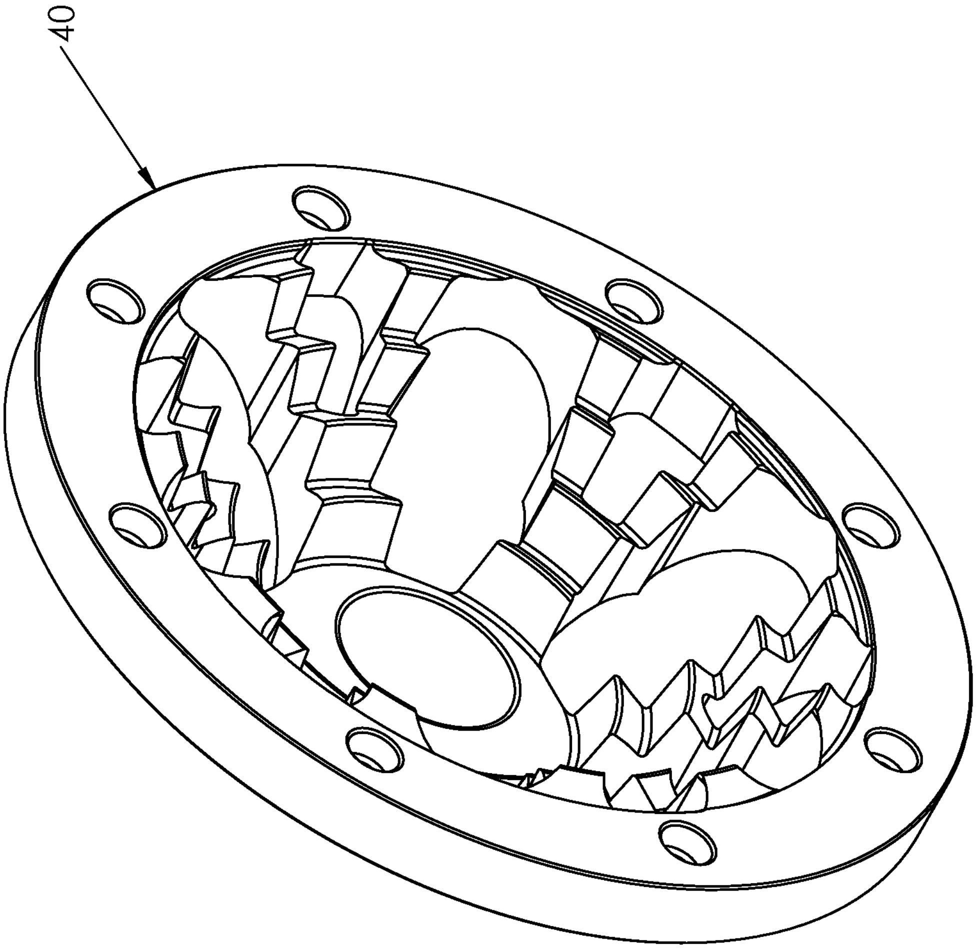
FIG. 6*a* shows an embodiment of the invention wherein the cup-shaped, concave, plate cutter having a circular horizontal cross-section which is generally conical in configuration.
Figure 6B:
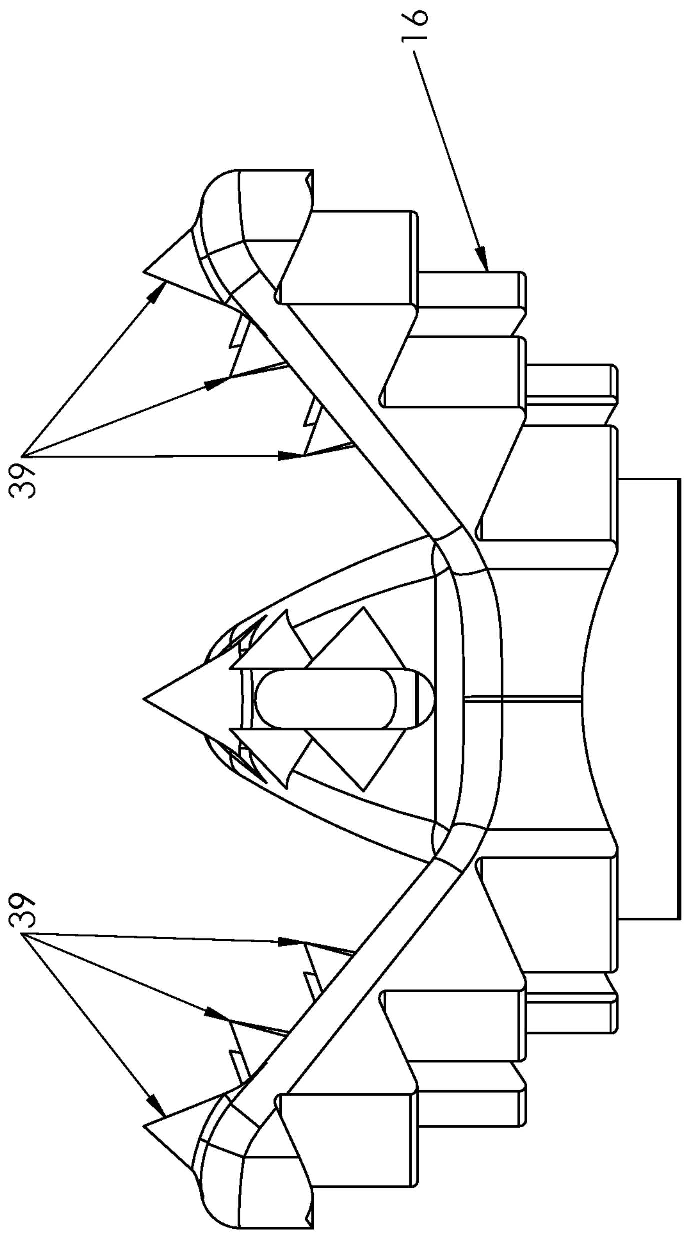
FIG. 6*b* shows an embodiment of the invention wherein the rotary cutter rotatably mates with the conical cup-shaped, concave, plate cutter.

FIG. 6*a* shows a top view of an embodiment of an embodiment of the invention wherein the cup-shaped, concave, plate cutter 40 has a circular horizontal cross-section which is generally conical in configuration. FIG. 6*b* shows an embodiment of the invention having the first rotary cutter 16 which rotatably mates with the generally conical cup-shaped, concave, plate cutter.

Figure 6C:
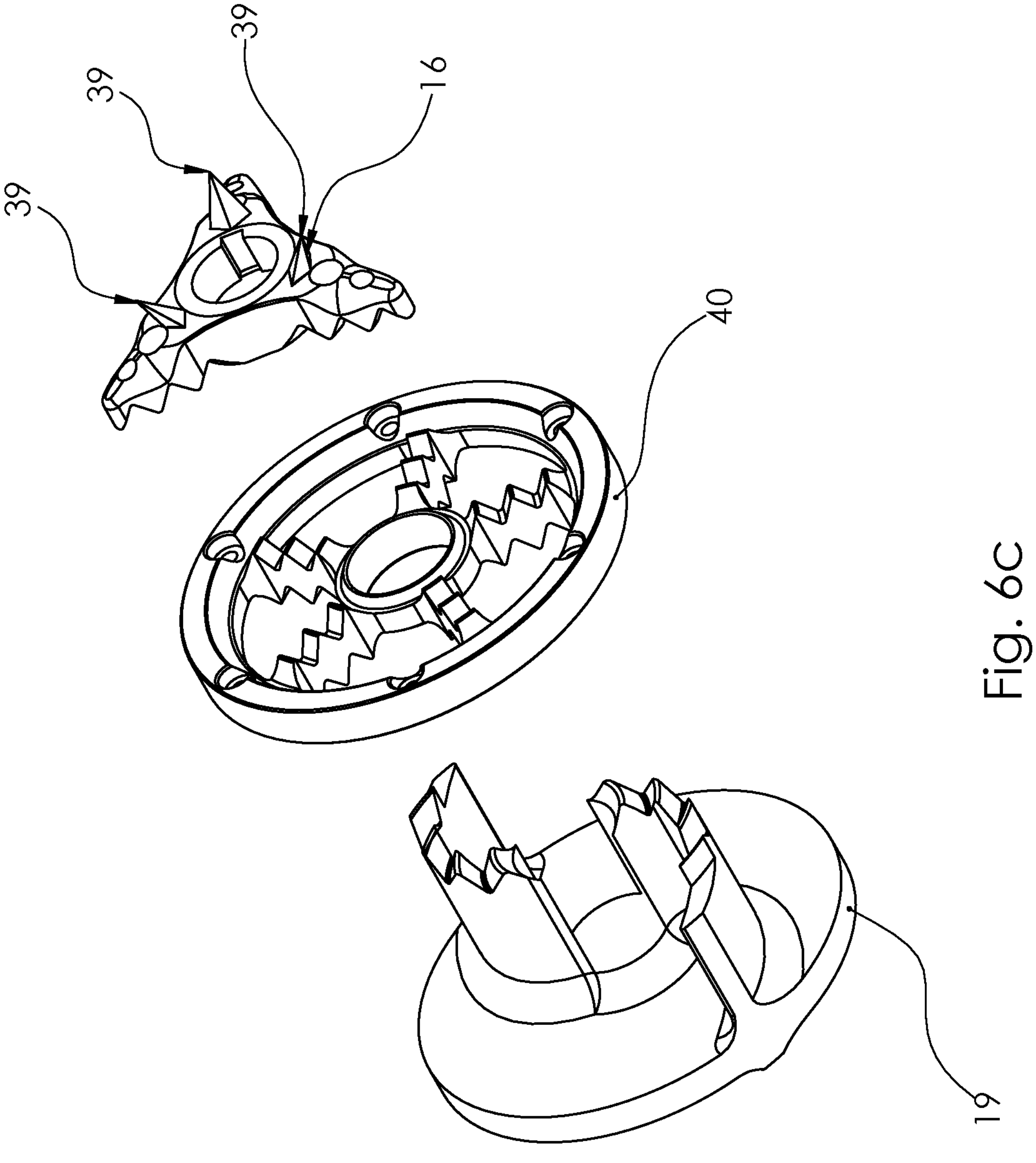
FIG. 6*c* shows a perspective view of an embodiment of the invention wherein the Circular plate cutter 40 is generally planar and a first side engages with first rotary cutter 16 and a second side engages with second rotary cutter 19.

FIG. 6*c* shows a perspective view of an embodiment of the invention wherein the Circular plate cutter 40 is generally planar and a first side engages with first rotary cutter 16 and a second side engages with second rotary cutter 19.

Figure 7A:
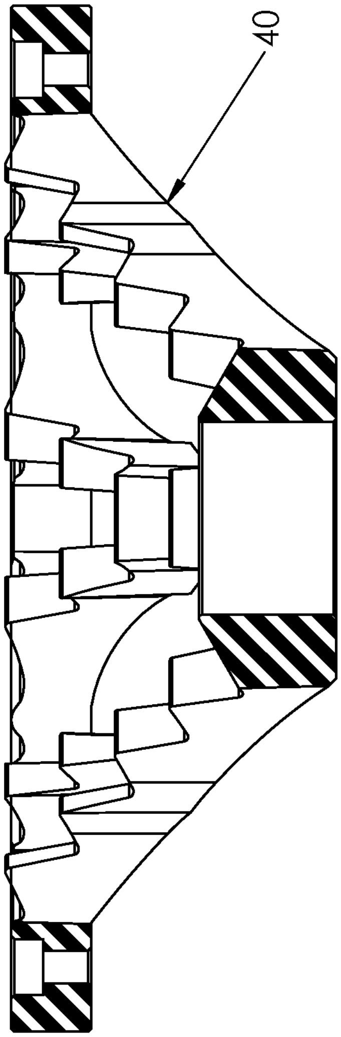
FIG. 7*a* shows an embodiment of the invention wherein the cup-shaped, concave, plate cutter having a circular horizontal cross-section which is generally semi-spherical in configuration.
Figure 7B:
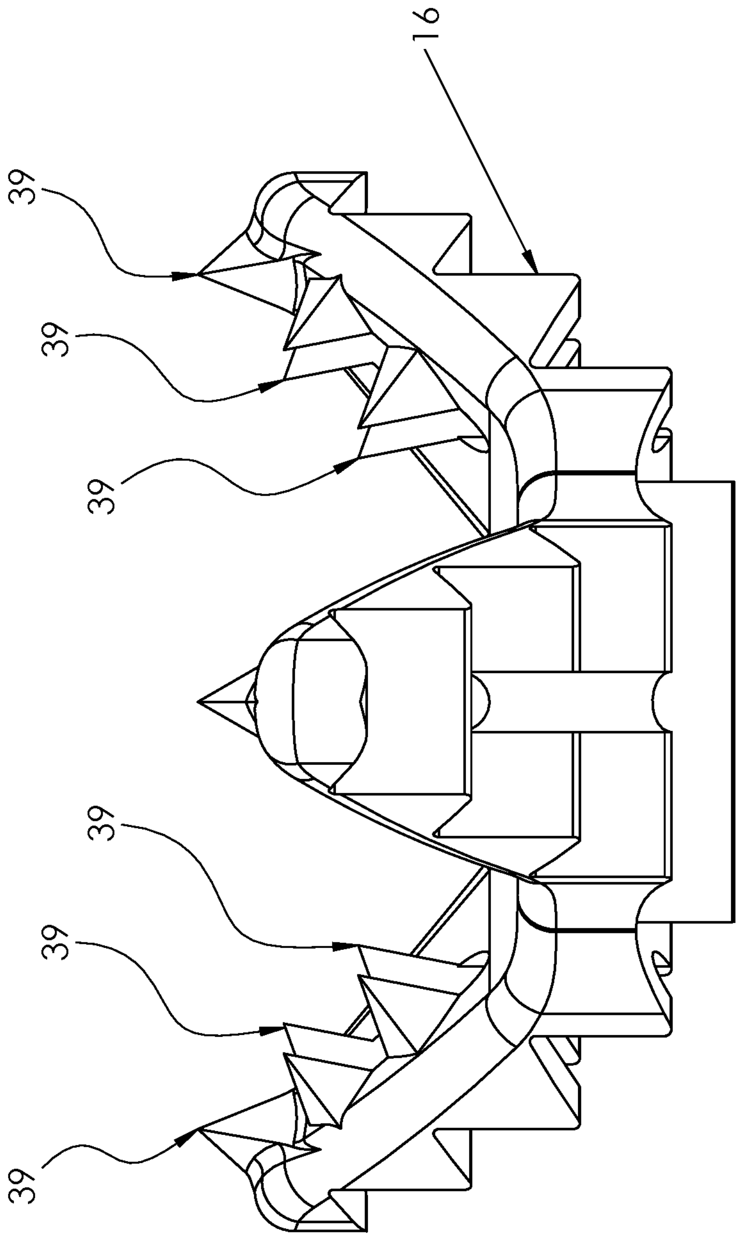
FIG. 7*b* shows an embodiment of the invention wherein the rotary cutter rotatably mates with the semi-spherical cup-shaped, concave, plate cutter.

FIG. 7*a* shows an embodiment of the invention wherein the cup-shaped, concave, plate cutter 40 having a circular horizontal cross-section is generally semi-spherical in configuration. The second cutting side is not shown in this Figure. FIG. 7*b* shows an embodiment of the invention having the rotary cutter 16 which rotatably mates with the generally semi-spherical cup-shaped, concave, plate cutter.

Figure 8:
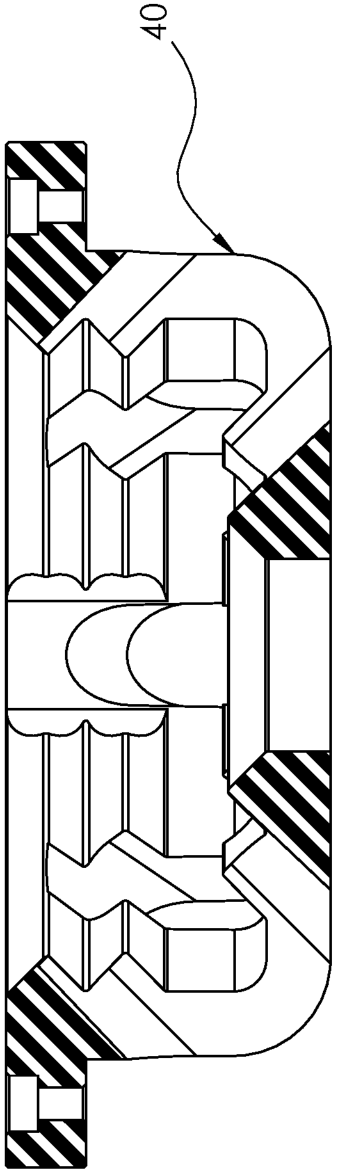
FIG. 8 shows an embodiment of the invention wherein the cup-shaped, concave, plate cutter having a circular horizontal cross-section is generally cylindrical in configuration.

FIG. 8 shows an embodiment of the invention wherein the cup-shaped, concave, plate cutter 40 having a circular horizontal cross-section is generally cylindrical in configuration. FIG. 8 shows an embodiment of the invention wherein the rotary cutter rotatably mates with the generally cylindrical cup-shaped, concave, plate cutter. The second cutting side is not shown in this Figure.

Figure 9:
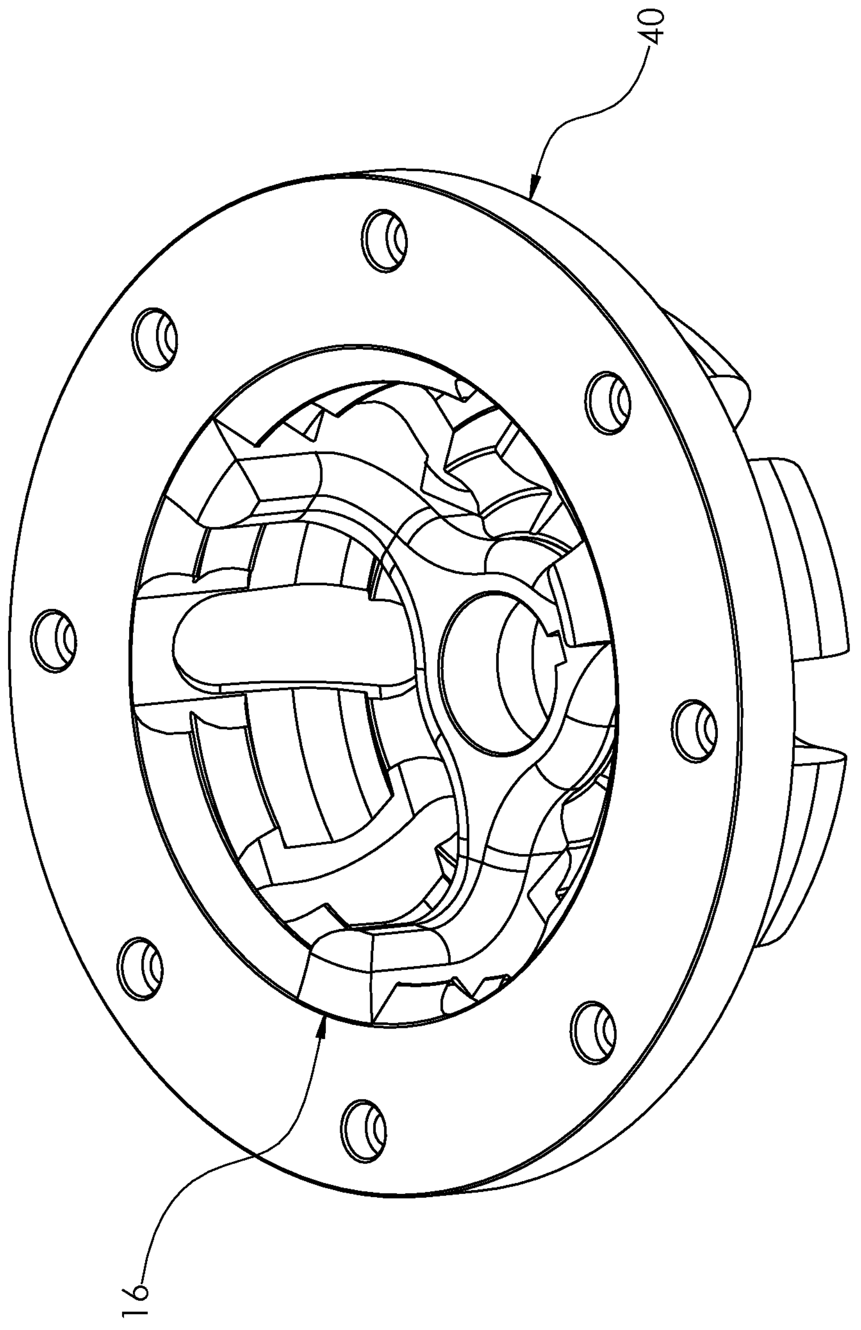
FIG. 9 shows an embodiment of the invention wherein the cup-shaped, concave, plate cutter having a circular horizontal cross-section which is generally cylindrical in configuration mated with a corresponding rotary cutter.

FIG. 9 shows an embodiment of the invention wherein the cup-shaped, concave, plate cutter 40 has a circular horizontal cross-section which is generally cylindrical in configuration mated with a corresponding rotary cutter 16. A similar mating arrangement is made with cup-shaped, concave, plate cutters having a semi-spherical or conical configuration.

Figure 10:
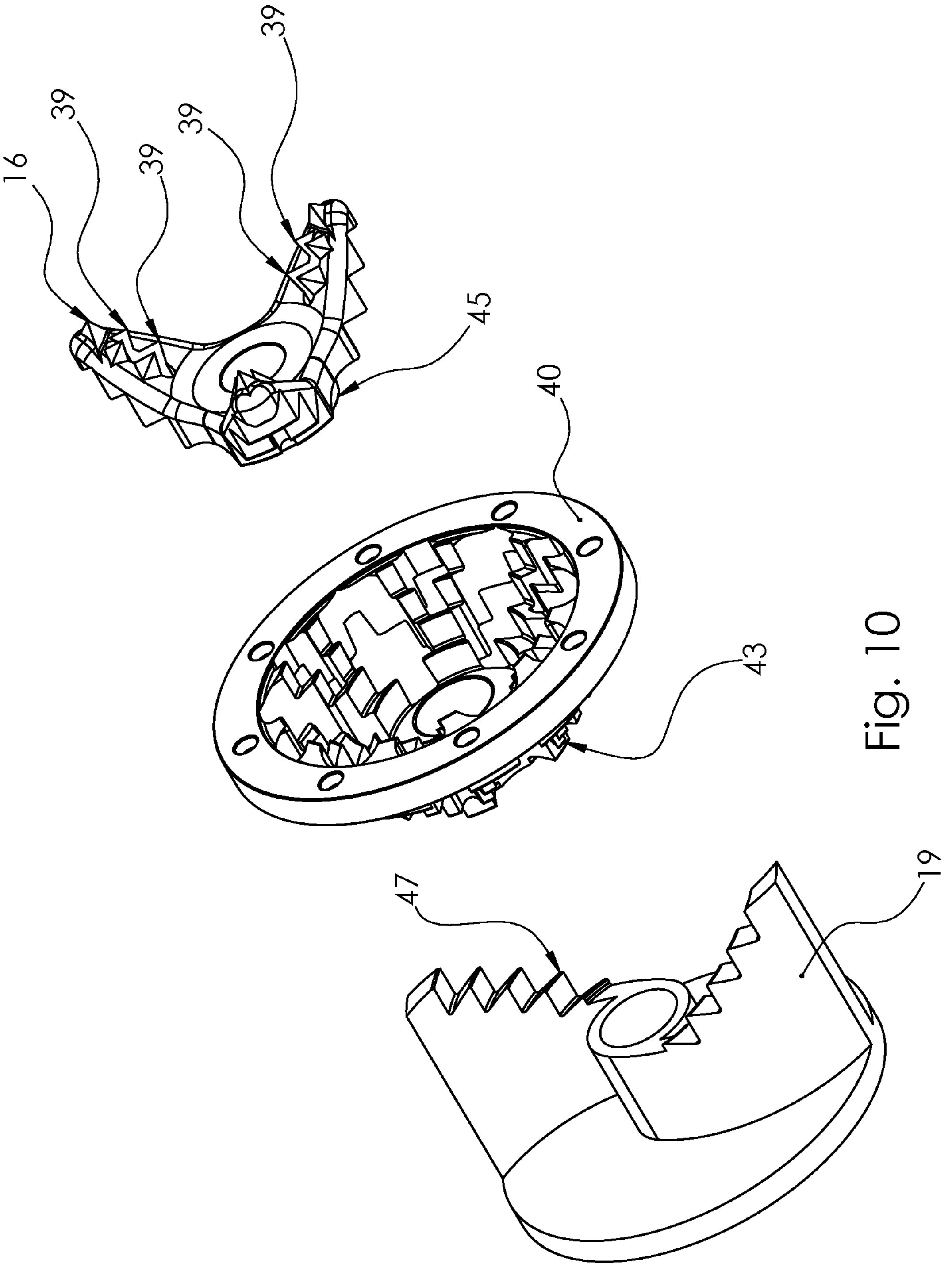
FIG. 10 shows an exploded view of an embodiment of the invention wherein a dual sided cup-shaped central plate cutter engages first and second rotary cutters.

FIG. 10 shows an exploded view of an embodiment of the invention showing a dual sided cup-shaped central plate cutter 40 having first cutting side 41 and second cutting side 43. First cutting side 41 engages with the under side 45 of first rotary cutter 16. Second cutting side 43 engages the cutting edge 47 of second rotary cutter 19.

Figure 11:
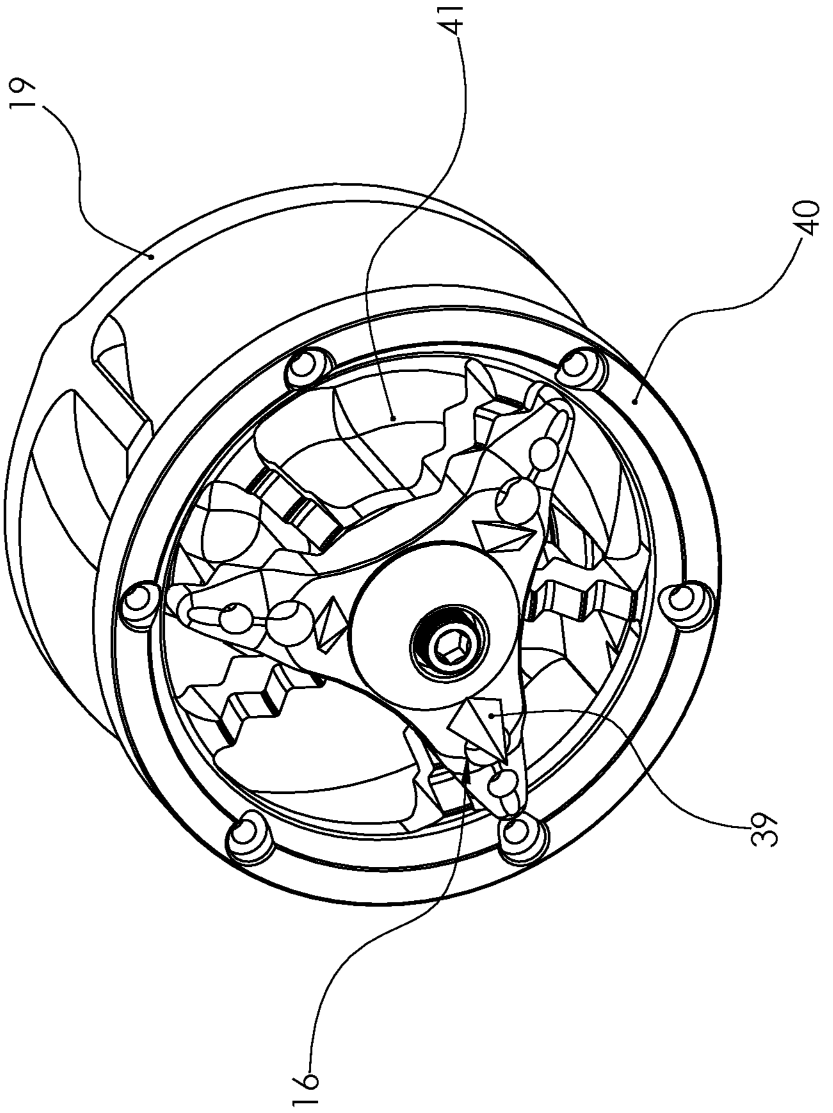
FIG. 11 shows a top view of an assembled cutting assembly showing a dual sided planar central plate cutter having first cutting side which engages with the under side of a first rotary cutter and a second cutting side engages the cutting edge of a second rotary cutter.

FIG. 11 shows a top view of an assembled cutting assembly according to the invention showing a dual sided planar central plate cutter 40 having first cutting side 41 which engages with the under side 45 of first rotary cutter 16. Second cutting side engages the cutting edge 47 second rotary cutter 19.

Figure 12:
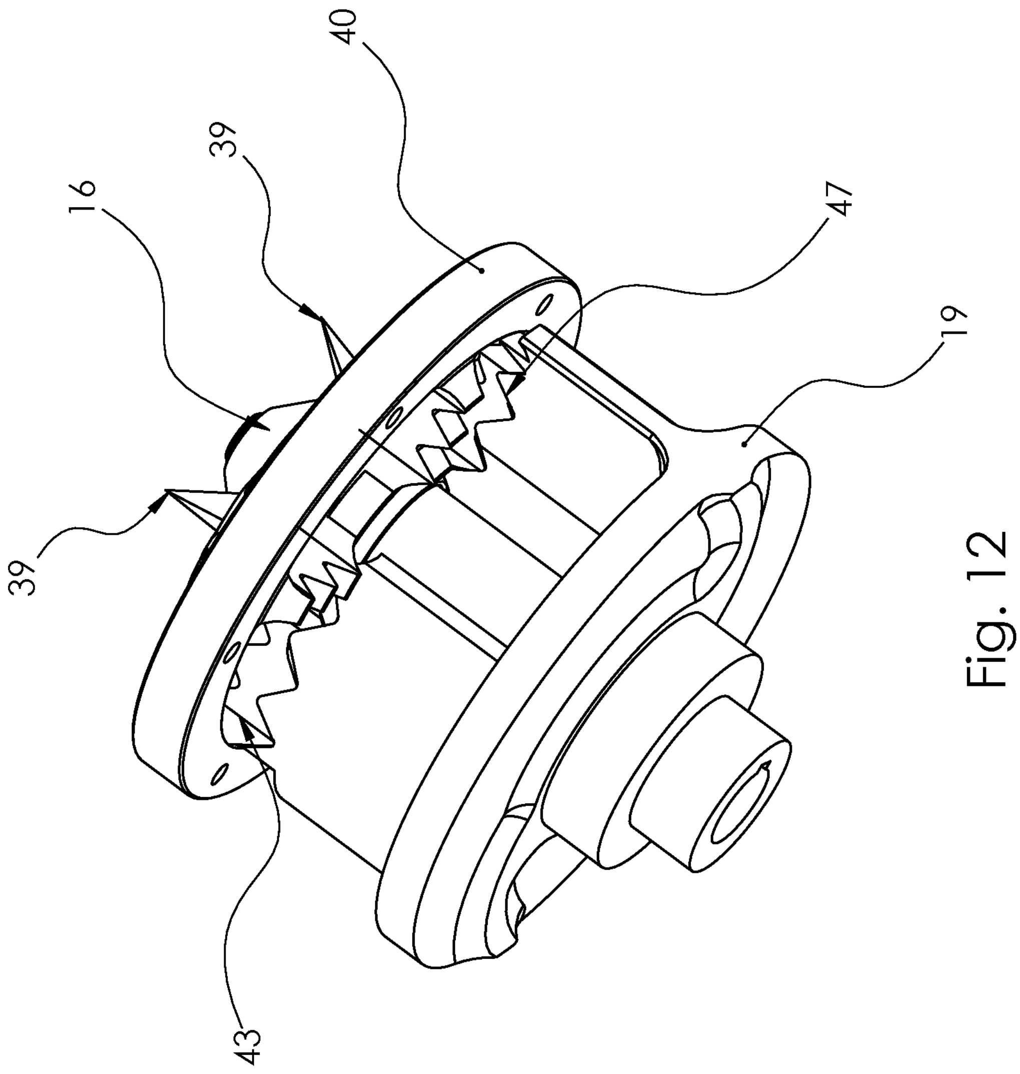
FIG. 12 shows a bottom view of an assembled cutting assembly wherein a dual sided planar central plate cutter has a first cutting side which engages with the under side of a first rotary cutter, and a second cutting side engages the cutting edge of a second rotary cutter.

FIG. 12 shows a bottom view of an assembled cutting assembly according to the invention showing a dual sided planar central plate cutter 40 having first cutting side which engages with the under side of first rotary cutter 16. Second cutting side 43 engages the cutting edge 47 of second rotary cutter 19.

Figure 13:
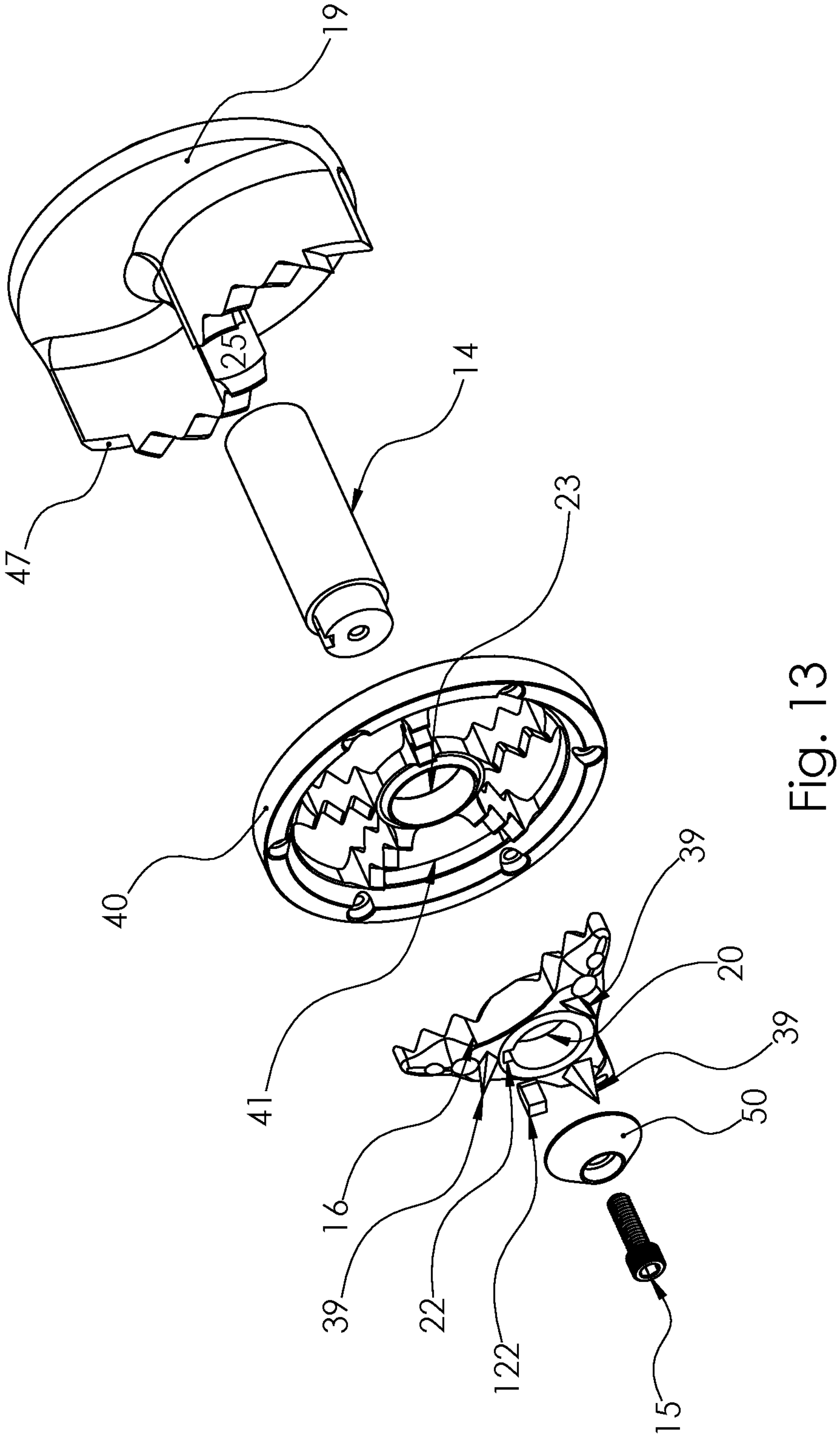
FIG. 13 shows an exploded view of a cutting assembly according to the invention showing a dual sided generally planar central plate cutter engaging with first and second rotary cutters via a drive shaft retained by a socket head screw and end cap.

FIG. 13 shows an exploded view of a cutting assembly according to the invention showing a dual sided generally planar central plate cutter 40 having a first cutting side 41 which engages with the under side of first rotary cutter 16. Second cutting side 43 engages the cutting edge 47 of second rotary cutter 19. Drive shaft 14 extends through a bore 20 through a central axis of the first rotary cutter 16; a plate cutter bore 23 through its floor, and a bore 25 through the floor of the second rotary cutter 19. Socket head screw 15 holds end cap 50 against rotary cutter 16, and preferably threads right into shaft 14.

In use, the invention further provides a method of shredding a solid within a liquid comprising first providing the above described a shredder pump; then causing the electric motor to rotate the drive shaft in at least one direction of rotation; then passing a liquid, and an optional solid, through the cutting assembly and into the volute, and then causing the impeller to propel the liquid and the optional solid through the discharge opening.

The configuration of these embodiments represents an advantage over the prior art cutter assemblies in that it keeps the solids captive while being shredded. The other types shred a portion of the solid item as it is sucked in, but then slings it out and returns into the liquid until is sucked in again by the pump. The cutter of this invention demonstrates that once a solid, such as a garment, gets sucked in the cup-shaped cutter assembly, it stays there until it is completely shredded.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A cutting assembly comprising:

a) a drive shaft alternately rotatable in a first direction of rotation and a second direction of rotation;

b) a centrally positioned plate cutter having a circular horizontal cross-section, the plate cutter configured for mounting to an intake opening of a stationary volute; said plate cutter having a first cutting side and an opposing second cutting side; each of the first cutting side and second cutting side of said plate cutter having one or more side walls terminating at a floor, and a plate cutter bore through the floor; each of the side walls having a plurality of spaced apart concentric grooves and a concentric dividing wall between adjacent concentric grooves; each of the concentric grooves and each of the dividing walls having the shape of an arc of a circle which is concentric with a central axis of the bore of the plate cutter; the drive shaft being mounted for rotation within the bore of the plate cutter; the plate cutter having a plurality of holes through the one or more side walls;

c) a first rotary cutter comprising a circular hub having a bore through a central axis of the circular hub, the first rotary cutter fixed to said drive shaft with an implement for fixing the drive shaft through the circular hub of the first rotary cutter within the bore; a plurality of cutting lobes fixed around the circular hub, each of said cutting lobes having an upper surface, a lower surface opposite to the upper surface, a leading edge and a trailing edge opposite to the leading edge; each cutting lobe having an aperture there through extending from and through the upper surface to and through the lower surface; each of the cutting lobes extending outwardly from the circular hub such that a center line equidistant between the leading edge and the trailing edge of each cutting lobe is perpendicular to the central axis of the circular hub; the cutting lobes being distributed around a periphery of the circular hub such that each of the distances from the leading edge of each cutting lobe to the trailing edge of a next adjacent cutting lobe are equal;

i) the lower surface of each cutting lobe having a plurality of spaced apart concentric grooves and a dividing wall between adjacent concentric grooves, the concentric grooves and dividing walls of each cutting lobe extending either from its leading edge to its trailing edge or from its leading edge to its aperture and from its aperture to its trailing edge; each of said concentric grooves and dividing walls having the shape of an arc of a circle which is concentric with the central axis of the circular hub; the concentric grooves and dividing walls from the lower surface of each cutting lobe being juxtaposed with corresponding dividing walls and concentric grooves from the first cutting side of the plate cutter;

ii) the upper surface of each cutting lobe having a plurality of spaced apart concentric grooves and a dividing wall between adjacent concentric grooves, the concentric grooves and dividing walls of each cutting lobe extending either from its leading edge to its trailing edge or from its leading edge to its aperture and from its aperture to its trailing edge; each of said concentric grooves and dividing walls having the shape of an arc of a circle which is concentric with the central axis of the circular hub;

d) a second rotary cutter comprising a second circular hub having a second bore through a central axis of the second circular hub, the second rotary cutter fixed to said drive shaft with an implement for fixing the drive shaft through the second circular hub of the second rotary cutter within the second bore; a plurality of cutting edges fixed around the circular hub, each of said cutting edges having an upper surface; each of the cutting edges extending outwardly from the circular hub substantially perpendicular to the central axis of the circular hub; the cutting edges being distributed around a periphery of the second circular hub; each cutting edge comprising a plurality of spaced apart concentric grooves and a dividing wall between adjacent concentric grooves; each of said concentric grooves and dividing walls having the shape of an arc of a circle which is concentric with the central axis of the second circular hub; the concentric grooves and dividing walls from the upper surface of each cutting edge being juxtaposed with corresponding dividing walls and concentric grooves from the second cutting side of the plate cutter.

2. The cutting assembly of claim 1 wherein the centrally positioned plate cutter is cup shaped.

3. The cutting assembly of claim 1 wherein the centrally positioned plate cutter is semi-spherical in shape.

4. The cutting assembly of claim 1 wherein the centrally positioned plate cutter is conical in shape.

5. The cutting assembly of claim 1 wherein the centrally positioned plate cutter is cylindrical in shape.

6. The cutting assembly of claim 1 wherein each of the concentric grooves and dividing wall between adjacent concentric grooves form a V-shaped cross-section, or a rectangular shaped cross-section, or a semi-circular shaped cross-section.

7. The cutting assembly of claim 1 wherein the implement for fixing the drive shaft within the bore comprises a keyed joint.

8. The cutting assembly of claim 1 comprising from 2 to 6 cutting lobes.

9. A shredder pump comprising:

i) a stationary volute having an intake opening, and a discharge opening;

ii) a cutting assembly mounted in front of the intake opening, the cutting assembly comprising:

a) a drive shaft alternately rotatable in a first direction of rotation and a second direction of rotation;

b) a centrally positioned plate cutter having a circular horizontal cross-section, the plate cutter configured for mounting to an intake opening of a stationary volute; said plate cutter having a first cutting side and an opposing second cutting side; each of the first cutting side and second cutting side of said plate cutter having one or more side walls terminating at a floor, and a plate cutter bore through the floor; each of the side walls having a plurality of spaced apart concentric grooves and a concentric dividing wall between adjacent concentric grooves; each of the concentric grooves and each of the dividing walls having the shape of an arc of a circle which is concentric with a central axis of the bore of the plate cutter; the drive shaft being mounted for rotation within the bore of the plate cutter; the plate cutter having a plurality of holes through the one or more side walls;

c) a first rotary cutter comprising a circular hub having a bore through a central axis of the circular hub, the first rotary cutter fixed to said drive shaft with an implement for fixing the drive shaft through the circular hub of the first rotary cutter within the bore; a plurality of cutting lobes fixed around the circular hub, each of said cutting lobes having an upper surface, a lower surface opposite to the upper surface, a leading edge and a trailing edge opposite to the leading edge; each cutting lobe having an aperture there through extending from and through the upper surface to and through the lower surface; each of the cutting lobes extending outwardly from the circular hub such that a center line equidistant between the leading edge and the trailing edge of each cutting lobe is perpendicular to the central axis of the circular hub; the cutting lobes being distributed around a periphery of the circular hub such that each of the distances from the leading edge of each cutting lobe to the trailing edge of a next adjacent cutting lobe are equal;

i) the lower surface of each cutting lobe having a plurality of spaced apart concentric grooves and a dividing wall between adjacent concentric grooves, the concentric grooves and dividing walls of each cutting lobe extending either from its leading edge to its trailing edge or from its leading edge to its aperture and from its aperture to its trailing edge; each of said concentric grooves and dividing walls having the shape of an arc of a circle which is concentric with the central axis of the circular hub; the concentric grooves and dividing walls from the lower surface of each cutting lobe being juxtaposed with corresponding dividing walls and concentric grooves from the first cutting side of the plate cutter;

ii) the upper surface of each cutting lobe having a plurality of spaced apart concentric grooves and a dividing wall between adjacent concentric grooves, the concentric grooves and dividing walls of each cutting lobe extending either from its leading edge to its trailing edge or from its leading edge to its aperture and from its aperture to its trailing edge; each of said grooves and dividing walls having the shape of an arc of a circle which is concentric with the central axis of the circular hub;

d) a second rotary cutter comprising a second circular hub having a second bore through a central axis of the second circular hub, the second rotary cutter fixed to said drive shaft with an implement for fixing the drive shaft through the second circular hub of the second rotary cutter within the second bore; a plurality of cutting edges fixed around the circular hub, each of said cutting edges having an upper surface; each of the cutting edges extending outwardly from the circular hub perpendicular to the central axis of the circular hub; the cutting edges being distributed around a periphery of the second circular hub; each cutting edge comprising a plurality of spaced apart concentric grooves and a dividing wall between adjacent concentric grooves; each of said concentric grooves and dividing walls having the shape of an arc of a circle which is concentric with the central axis of the second circular hub; the concentric grooves and dividing walls from the upper surface of each cutting edge being juxtaposed with corresponding dividing walls and concentric grooves from the second cutting side of the plate cutter;

wherein the drive shaft is mounted for rotation through a wall of the stationary volute by a bearing and sealed by a mechanical seal; iii) an impeller in the stationary volute fixed around the drive shaft; iv) an electric motor attached to an outer portion of the stationary volute, and fixed to the drive shaft for rotating the drive shaft within the stationary volute.

10. The shredder pump of claim 9 wherein the electric motor is a bidirectional electric motor capable of rotating the shaft alternately in a first direction of rotation and a second direction of rotation.

11. The shredder pump of claim 9 further comprising a controller for alternating the direction of rotation of the shaft in a first direction of rotation and a second direction of rotation.

12. The shredder pump of claim 9 wherein the impeller is a bidirectional impeller capable of moving a liquid in the stationary volute in the direction of the discharge opening when the shaft is rotating in each of the first direction of rotation and a second direction of rotation.

13. The shredder pump of claim 9 wherein the plate cutter is semi-spherical in shape.

14. The shredder pump of claim 9 wherein the plate cutter is conical in shape.

15. The shredder pump of claim 9 wherein the plate cutter is cylindrical in shape.

16. The shredder pump of claim 9 wherein each of the concentric grooves and dividing wall between adjacent concentric grooves form a V-shaped cross-section, or a rectangular shaped cross-section, or a semi-circular shaped cross-section.

17. The shredder pump of claim 9 wherein the implement for fixing the drive shaft within the bore comprises a keyed joint.

18. The shredder pump of claim 9 comprising from 2 to 6 cutting lobes.

19. A method of shredding a solid within a liquid comprising:

I) providing a shredder pump comprising:

i) a stationary volute having an intake opening, and a discharge opening;

ii) a cutting assembly mounted in front of the intake opening, the cutting assembly comprising:

a) a drive shaft alternately rotatable in a first direction of rotation and a second direction of rotation;

b) a centrally positioned plate cutter having a circular horizontal cross-section, the plate cutter configured for mounting to an intake opening of a stationary volute; said plate cutter having a first cutting side and an opposing second cutting side; each of the first cutting side and second cutting side of said plate cutter having one or more side walls terminating at a floor, and a plate cutter bore through the floor; each of the side walls having a plurality of spaced apart concentric grooves and a concentric dividing wall between adjacent concentric grooves; each of the concentric grooves and each of the dividing walls having the shape of an arc of a circle which is concentric with a central axis of the bore of the plate cutter; the drive shaft being mounted for rotation within the bore of the plate cutter; the plate cutter having a plurality of holes through the one or more side walls;

c) a first rotary cutter comprising a circular hub having a bore through a central axis of the circular hub, the first rotary cutter fixed to said drive shaft with an implement for fixing the drive shaft through the circular hub of the first rotary cutter within the bore; a plurality of cutting lobes fixed around the circular hub, each of said cutting lobes having an upper surface, a lower surface opposite to the upper surface, a leading edge and a trailing edge opposite to the leading edge; each cutting lobe having an aperture there through extending from and through the upper surface to and through the lower surface; each of the cutting lobes extending outwardly from the circular hub such that a center line equidistant between the leading edge and the trailing edge of each cutting lobe is perpendicular to the central axis of the circular hub; the cutting lobes being distributed around a periphery of the circular hub such that each of the distances from the leading edge of each cutting lobe to the trailing edge of a next adjacent cutting lobe are equal;

i) the lower surface of each cutting lobe having a plurality of spaced apart concentric grooves and a dividing wall between adjacent concentric grooves, the concentric grooves and dividing walls of each cutting lobe extending either from its leading edge to its trailing edge or from its leading edge to its aperture and from its aperture to its trailing edge; each of said concentric grooves and dividing walls having the shape of an arc of a circle which is concentric with the central axis of the circular hub; the concentric grooves and dividing walls from the lower surface of each cutting lobe being juxtaposed with corresponding dividing walls and concentric grooves from the first cutting side of the plate cutter;

ii) the upper surface of each cutting lobe having a plurality of spaced apart concentric grooves and a dividing wall between adjacent concentric grooves, the concentric grooves and dividing walls of each cutting lobe extending either from its leading edge to its trailing edge or from its leading edge to its aperture and from its aperture to its trailing edge; each of said concentric grooves and dividing walls having the shape of an arc of a circle which is concentric with the central axis of the circular hub;

d) a second rotary cutter comprising a second circular hub having a second bore through a central axis of the second circular hub, the second rotary cutter fixed to said drive shaft with an implement for fixing the drive shaft through the second circular hub of the second rotary cutter within the second bore; a plurality of cutting edges fixed around the circular hub, each of said cutting edges having an upper surface; each of the cutting edges extending outwardly from the circular hub perpendicular to the central axis of the circular hub; the cutting edges being distributed around a periphery of the second circular hub; each cutting edge comprising a plurality of spaced apart concentric grooves and a dividing wall between adjacent concentric grooves; each of said concentric grooves and dividing walls having the shape of an arc of a circle which is concentric with the central axis of the second circular hub; the concentric grooves and dividing walls from the upper surface of each cutting edge being juxtaposed with corresponding dividing walls and concentric grooves from the second cutting side of the plate cutter;

wherein the drive shaft is mounted for rotation through a wall of the stationary volute by a bearing and sealed by a mechanical seal; iii) an impeller in the stationary volute fixed around the drive shaft; iv) an electric motor attached to an outer portion of the stationary volute, and fixed to the drive shaft for rotating the drive shaft within the stationary volute;

II) causing the electric motor to rotate the drive shaft in at least one direction of rotation;

III) passing the liquid, and the solid, through the cutting assembly and into the stationary volute, and then causing the impeller to propel the liquid and the solid through the discharge opening.

20. The method of claim 19 wherein the plate cutter is semi-spherical in shape, or conical in shape, or cylindrical in shape; and wherein the impeller is a bidirectional impeller capable of moving a liquid in the stationary volute in the direction of the discharge opening when the shaft is rotating in each of the first direction of rotation and a second direction of rotation.

* * * * *